Figure 1:
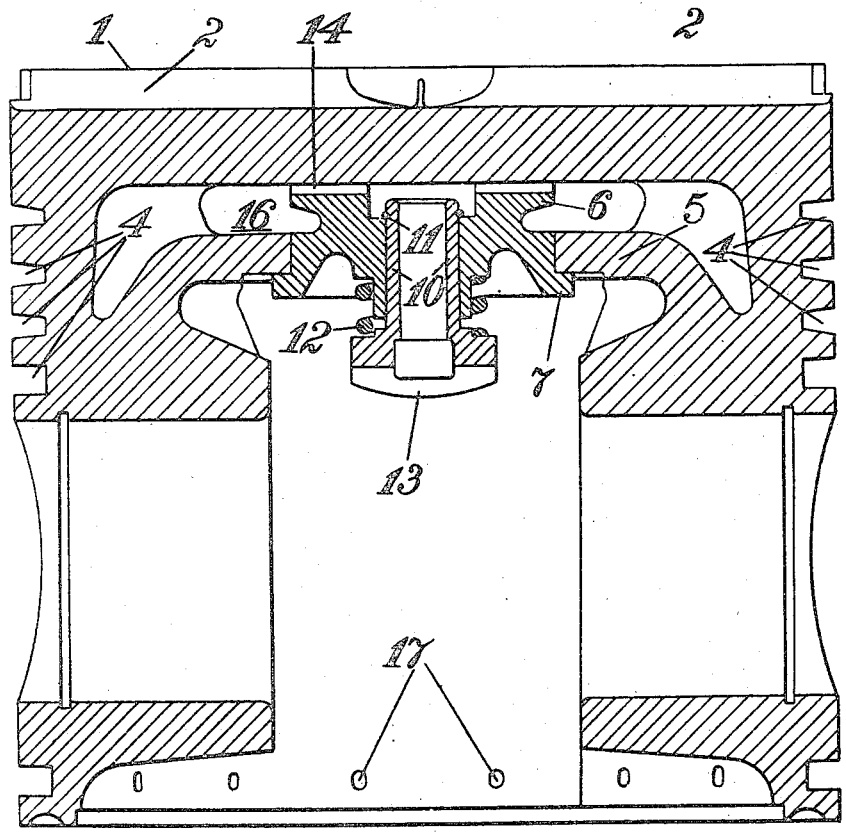

June 1, 1948. A. S. ROBINSON ET AL 2,442,438
COOLING ROD AND PISTON

Filed Nov. 29, 1945 3 Sheets-Sheet 1

Inventors
A. S. Robinson
H. W. Wills

June 1, 1948.  A. S. ROBINSON ET AL  2,442,438
COOLING ROD AND PISTON

Filed Nov. 29, 1945  3 Sheets-Sheet 2

Inventors
A. S. Robinson
H. W. Willis
By Glascock Downing &c
Attys.

June 1, 1948.  A. S. ROBINSON ET AL  2,442,438
COOLING ROD AND PISTON

Filed Nov. 29, 1945  3 Sheets-Sheet 3

Inventors
A. S. Robinson
H. W. Wills
By Stewart Downing Ruebel
attys

Patented June 1, 1948

2,442,438

UNITED STATES PATENT OFFICE 2,442,438

COOLING ROD AND PISTON

Albert Stanley Robinson and Herbert William Wills, London, England, assignors to Specialloid Limited, London, England Application November 29, 1945, Serial No. 631,660
In Great Britain June 7, 1944

Section 1, Public Law 690, August 8, 1946
Patent expires June 7, 1964

2 Claims. (Cl. 123—176)

1

This invention relates to pistons of the type in which adjacent to the piston head there is provided a chamber to which oil may be admitted by way of a passage in the connecting rod to cool the crown and upper portion of the piston, including that portion of the walls thereof in which the compression rings or certain of the compression rings are located.

Hitherto such pistons have comprised an inner part and an outer part secured together by bolts to provide the chamber and in certain constructions in the part which forms the lower portion of the chamber there has been provided a member with which is associated a spring causing it to seat upon the upper end of the piston rod and permit passage of oil to the chamber from which oil may return to the sump of the engine by way of restricted apertures extending from the chamber.

The object of the invention to to provide an improved construction of piston of the type referred to.

According to the invention the chamber is formed in the piston head by the provision therein of an integral diaphragm member extending from the walls of the piston towards its axis and furnished with an aperture through which oil may be delivered into the chamber.

The aperture may be provided by a member slidably engaged in the diaphragm or in a bush provided in the diaphragm and with this member there may be associated a spring adapted resiliently to press it into contact with the upper end of the piston rod in order to promote a satisfactory seal between the outer surfaces thereof and the face of the member.

In some cases a bush in the diaphragm may be arranged so that its outer extremity itself seats upon the upper end of the piston rod sufficiently closely to ensure that the lubricating oil passing up the passage in the piston rod will be delivered into the chamber.

In either case the bush may be arranged to extend to a position closely adjacent to the head of the piston and be furnished with grooves or the like adapted to promote the distribution of the oil more or less uniformly towards the peripheral wall of the chamber.

The bush may be screw threaded into the diaphragm or may be secured thereto in any other convenient manner as, for instance, by nuts engaging studs secured in the diaphragm or by screws and passing through holes in a flange on the bushing.

The constructional details may be varied within wide limits and may generally resemble the corresponding details of construction of pistons of the type generally above referred to, excepting insofar as modifications of these constructions may be necessitated by the formation of one of the walls of the chamber as a diaphragm integral with the body of the piston.

The diaphragm may be dished, that is to say its periphery may be brought downward to a position adjacent to the upper level of the gudgeon pin bosses so as to provide a space for oil which extends so far as is convenient towards the level of the lower of the compression rings.

In many cases, however, the lowermost portion of the chamber will terminate at a level somewhat above the lower compression rings.

Within the chamber there may be provided on the walls of the piston fins extending in a generaly radial direction therefrom towards the axis of the piston in order further to promote cooling of the portion of the crown of the piston and that portion of the walls in which the grooves for the compression rings are formed.

The head of the piston may be of the plain or pot or other known type and may be provided with recessed portions into which the heads of the valves of the engine with which the piston is associated may extend.

The invention will be described further in detail and by way of example with reference to the accompanying drawings, in which—

Figure 2:
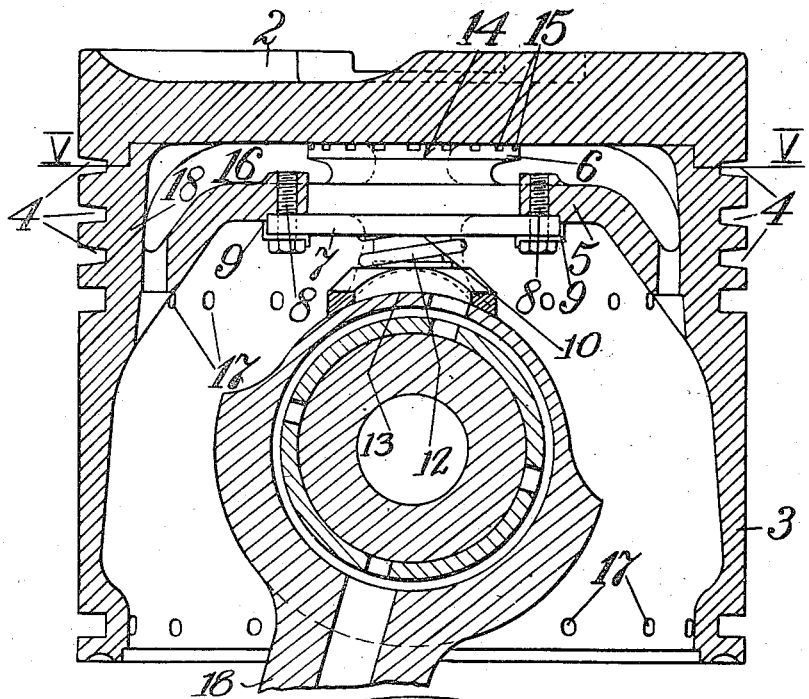
Figure 4:
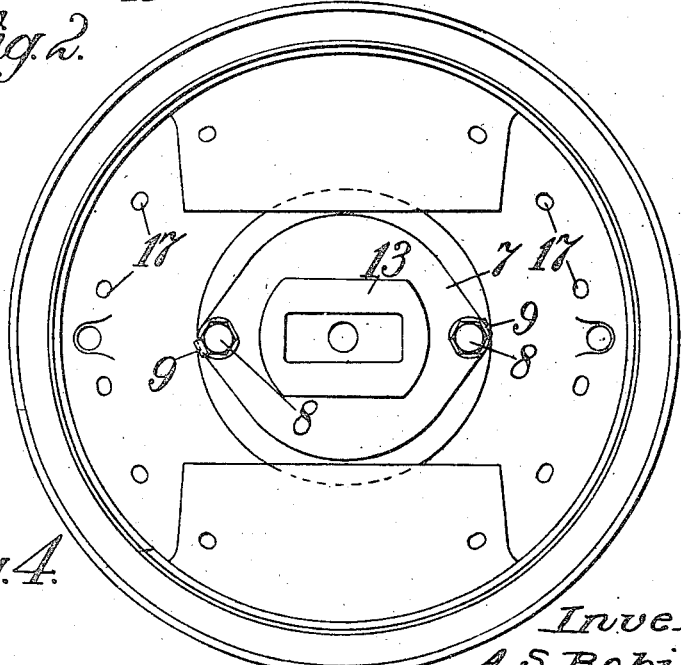
Figure 5:
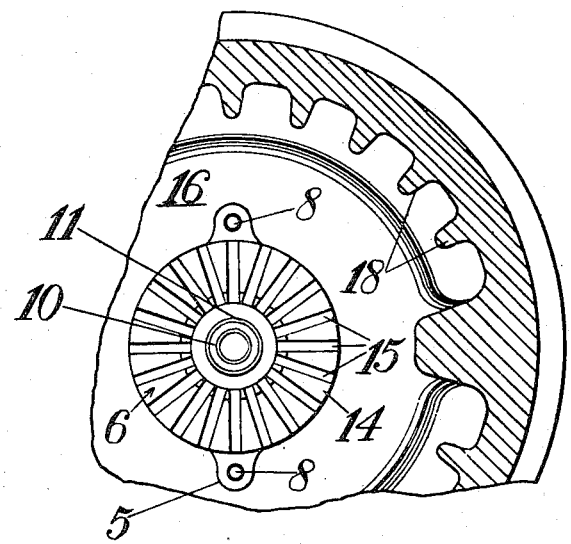
Figure 3:
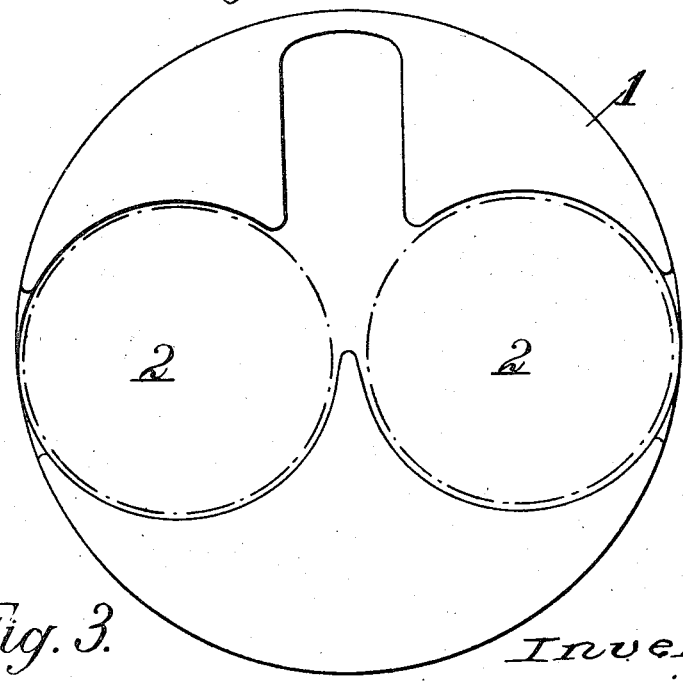

Figure 1 is a view in section on a plane containing the axis of the gudgeon pin bosses, Figure 2 is a sectional elevation on a plane at right angles to the plane of section of Figure 1, Figure 3 is a plan view, Figure 4 is an inverted plan view, and Figure 5 is a fragmentary section on a plane indicated by the line VV of Figure 1.

In the drawings, 1 is the crown of the piston which in the particular construction illustrated is provided with a recessed portion 2 into which the valves of the engine with which the piston is associated will extend, 3 is the skirt portion of the piston, 4 the piston ring grooves adjacent the head of the piston and adjacent the crown there is provided an integral diaphragm member 5 extending from the walls of the piston head towards its axis and in this diaphragm there is engaged a bush 6 furnished with a flange 7 provided with holes through which pass screws 8 for securing it in position, the heads being engaged by locking washers 9.

In the bush is provided an aperture in which is slidably engaged a member 10 provided with a groove in which a spring ring 11 is engaged to prevent the member becoming detached from the bush. About the member is located a spring 12 adapted resiliently to press the face 13 of the member into contact with the upper end of the piston rod 18 when the piston is in use in order to promote a satisfactory seal between the outer surface of the upper end of the piston rod and the face of the member as shown.

The bush comprises a portion 14 extending to the crown of the piston and furnished with a plurality of grooves 15 through which oil supplied through the piston rod will be projected into the chamber 16 which as will be seen is formed to extend adjacent to its periphery downward, in consequence of the dished formation of the diaphragm, to a position adjacent to the upper level of the gudgeon pin bosses so as to provide a space for oil which extends so far as is convenient towards the level of the lowermost of the compression rings so that the oil delivered to the chamber will tend to flow towards this portion of the chamber from which it will be discharged by way of a plurality of apertures 17.

Within the chamber there are provided as may be seen more clearly from Figure 5 a plurality of fins 18 extending in a generally radial direction towards the axis of the piston in order further to promote cooling of the portion of the crown of the piston and that portion of the walls in which the grooves for the compression rings are formed.

The invention is more particularly applicable to pistons formed of light metal alloys of which the following may be given as typical examples:

Y alloy, aluminum alloys of high silicon content such as aluminum alloys having a content of between 10 and 25% of silicon and especially such as have a silicon content of 12% and alloys of the so-called RR range, such as RR 53.

Where the pistons are formed of aluminum alloys they may be anodised or alternatively or in addition they may be plated with tin or other metal which may have a lubricative action.

Alternatively, where anodised, the anodised coating may be impregnated with a solid or liquid lubricative material.

Pistons in accordance with the invention where mainly formed of a light metal may have an insert of iron, steel or other metal arranged adjacent to the crown, the insert being, for instance, an annular member provided with grooves for the accommodation of compression rings.

We claim:

1. A piston of the character described comprising a head having a crown, side walls and a skirt, all formed in a single piece, an integral diaphragm member extending from the walls of the head towards the axis thereof and spaced from the crown to provide a chamber and provided with a central aperture, a bush arranged through the aperture and extending to a position closely adjacent to the inner surface of the crown of the piston head and provided on its outer face with radial grooves for promoting the distribution of oil uniformly towards the peripheral wall of the chamber, a flange on the bush arranged against the outer face of the diaphragm, means for removably securing the flange and bush in position, a tubular member slidably mounted in the bush and through which oil is delivered to the chamber, and a spring arranged about the tubular member adapted for resiliently pressing the same in contact with the upper end of a piston rod in order to provide a satisfactory seal between the outer surfaces thereof and the face of said member.

2. A piston as claimed in claim 1 in which within the chamber there is provided on the walls of the piston fins extending in a generally radial direction therefrom towards the axis of the piston in order further to promote cooling of the portion of the crown of the piston and adjacent portion of the walls.

ALBERT STANLEY ROBINSON.
HERBERT WILLIAM WILLS.

REFERENCES CITED

The following references are of record in the file of this patent:

UNITED STATES PATENTS

| Number | Name | Date |
|---|---|---|
| 76,268 | Swayne | Mar. 31, 1868 |
| 1,157,347 | Ver Planck | Oct. 19, 1915 |
| 1,228,049 | Rich | May 29, 1917 |
| 1,628,652 | Carlson | May 17, 1927 |
| 1,639,062 | Sperry | Aug. 16, 1927 |
| 1,856,107 | Mellor | May 3, 1932 |
| 2,046,196 | Truxell | June 30, 1936 |
| 2,241,629 | Brill | May 13, 1941 |
| 2,362,158 | Ricardo | Nov. 7, 1944 |